United States Patent [19]

Zink et al.

[11] Patent Number: 5,303,843

[45] Date of Patent: Apr. 19, 1994

[54] FLUID TRANSPORT APPARATUS WITH WATER HAMMER ELIMINATOR SYSTEM

[75] Inventors: Donald L. Zink, Billings, Mont.; Donald G. Zink, New Orleans, La.; John E. Schwartz, Billings, Mont.

[73] Assignee: Montana Sulphur & Chemical Co., Billings, Mont.

[21] Appl. No.: 594,150

[22] Filed: Oct. 9, 1990

[51] Int. Cl.$^5$ .................... B65D 88/16; B65D 90/04
[52] U.S. Cl. .................. 220/563; 220/564; 220/721; 220/722; 220/89.2; 105/358
[58] Field of Search ............ 220/562, 563, 564, 581, 220/584, 585, 4.14, 720, 721, 729, 730, 89.1, 89.2; 138/30; 417/540; 105/358, 360, 362

[56] References Cited

U.S. PATENT DOCUMENTS

| | | |
|---|---|---|
| 935,210 | 1/1909 | Lindstrom . |
| 1,661,324 | 5/1924 | Davis, Jr. . |
| 2,144,292 | 1/1938 | Holby . |
| 2,497,020 | 2/1950 | Singer . |
| 2,503,792 | 4/1950 | Brandon . |
| 2,586,671 | 10/1952 | Landis . |
| 2,732,040 | 3/1953 | De Vost et al. . |
| 3,046,751 | 7/1962 | Gardner . |
| 3,112,845 | 12/1963 | Bryant . |
| 3,328,496 | 6/1967 | Graves . |
| 3,331,398 | 7/1967 | Goss . |
| 3,336,879 | 8/1967 | Halcomb . |
| 3,388,823 | 6/1968 | Fleming et al. . |
| 3,390,644 | 7/1968 | Krauskopf . |
| 3,400,854 | 9/1968 | Conaway et al. . |
| 3,503,600 | 3/1970 | Rich . |
| 3,520,437 | 7/1970 | Fleming et al. . |
| 3,680,662 | 8/1972 | Walker et al. . |
| 3,687,087 | 8/1972 | Yurkoski et al. . |
| 3,712,502 | 1/1973 | Basier et al. . |
| 3,766,862 | 10/1973 | Heap et al. . |
| 3,782,128 | 1/1974 | Hampton et al. . |
| 3,784,050 | 1/1974 | Pollack . |
| 3,787,279 | 1/1974 | Winchester . |
| 3,804,291 | 4/1974 | Fricker . |
| 3,902,624 | 9/1975 | Stephenson . |
| 3,924,773 | 12/1975 | Wilkinson . |
| 4,000,826 | 1/1977 | Rogers . |
| 4,061,384 | 12/1977 | Montgomery et al. . |
| 4,166,550 | 9/1979 | Kleinschmit et al. . |
| 4,172,573 | 10/1979 | Moore et al. . |
| 4,176,858 | 12/1979 | Kornhauser . |
| 4,241,755 | 12/1980 | Snyder . |
| 4,251,005 | 2/1981 | Sons et al. . |
| 4,305,428 | 12/1981 | Burton . |
| 4,376,489 | 3/1983 | Clemens . |
| 4,403,783 | 9/1983 | Henderson . |
| 4,427,045 | 1/1984 | Headrick . |
| 4,434,991 | 3/1984 | Winterton . |
| 4,441,751 | 4/1984 | Wesley . |
| 4,466,356 | 8/1984 | Messersmith et al. . |
| 4,483,454 | 11/1984 | Rogers et al. . |
| 4,624,388 | 11/1986 | Chang et al. ............ 220/721 |
| 4,796,773 | 1/1989 | Gerhard . |
| 4,925,057 | 5/1990 | Childress et al. ......... 220/723 |
| 5,038,960 | 8/1991 | Seery .................... 220/723 |
| 5,117,873 | 6/1992 | Miyakawa et al. ......... 220/721 |

Primary Examiner—Joseph Man-Fu Moy
Attorney, Agent, or Firm—Banner, Birch, McKie & Beckett

[57] ABSTRACT

A fluid transport apparatus including an elongated fluid vessel for transporting fluid, such as LPG. One or more breakable containers of compressible fluid are positioned within the fluid vessel. The containers are adapted to break by the force of the vessel fluid surging against them when the fluid vessel is impacted. The compressible fluid within the containers dissipates or eliminates the water hammer pressure resulting from the impact and thereby prevents the walls of the fluid vessel from failing. The breakable containers can be end partitions with one or more rupture discs thereon or collapsible pressurized containers, such as ordinary tennis balls, held at one or both vessel ends by internal breakaway partition walls.

39 Claims, 3 Drawing Sheets

FLUID TRANSPORT APPARATUS WITH WATER HAMMER ELIMINATOR SYSTEM

BACKGROUND OF THE INVENTION

The present invention relates to fluid transport vessels such as rail tank cars adapted to transport hazardous liquids. It further relates to systems for eliminating the water hammer effect resulting from vessel wrecks and derailments and thereby protecting the vessel end walls from failing.

One of the concerns in the transportation of liquefied materials and particularly liquefied hazardous materials in tank cars and tank trailers is the failure of the vessel during collisions or derailments. One of the modes of failure of any pressure vessel is the so-called "water hammer" effect. Water hammer is a transient pressure peak developed by sudden deceleration of a mass of fluid. The pressure developed is a direct function of the vessel's change in velocity and, therefore, is directly proportional to the velocity of the liquid and inversely proportional to the time during which deceleration occurs. Since the velocity of pressure wave propagation is about four thousand feet per second, the maximum pressure head (in feet of fluid) developed is roughly equal to: a times D divided by g, or 125×D, where "a" is the velocity of pressure wave propagation in the system, "D" is the change in velocity in feet per second, and "g" is a dimensional constant of 32.17 (pounds) (feet)/(pound force) (seconds times seconds).

The peak value of the pressure developed is further reduced if the time of deceleration can be made greater than the time required for the pressure wave to travel from the point of stoppage (impact) to the point of reflection (the length of the vessel) and back. Since the velocity of wave propagation is about four thousand feet per second, this period is typically about one eightieth to one fiftieth of a second in a transport vessel. Limiting the speed of travel of such vessels is about the only way in which the initial velocity of the liquid can be reduced. However, changes in the vessel design can be made to extend the minimum time for deceleration or to absorb the pressure spike with a dramatic effect on the maximum pressure developed.

The primary cause of significant water hammer pressure in a transport vessel are head-on collisions of the vessel with immovable and inflexible objects, such as rock faces or concrete abutments, which impact the head of the vessel and thereby bring the vessel to a sudden stop. The fluid in the vessel continues to travel in the original direction and at the original speed for a very short period of time before the entire space at the head of vessel is filled with the relatively incompressible liquid. At this time, the kinetic energy of the moving liquid must be converted to pressure and dissipated thereby doing "work" on the walls of the vessel and on the liquid itself.

This pressure can as much as several thousand pounds per square inch in a tank car of a liquid, such as water, traveling at, for example, sixty miles per hour (eighty-eight feet per second). This is equal to about 5,000 psig, which is calculated as follows: 88×125=1,100 feet of head, or about 5,000 psig. This pressure can be enough to burst the end wall of the vessel. The peak pressure can be reduced by increasing the elasticity or compressibility of the system and by increasing the time allowed for deceleration.

The prior art has occasionally dealt with the water hammer problem in transportation vessels by increasing the wall thickness, and therefore its strength, sufficient to resist the water hammer pressures. Increasing the thickness of the walls is of limited practical value today, however, since at today's high transportation speeds extremely thick walls are required to resist pressures of several thousands pounds per square inch. The frequency of water hammer induced failures is fortunately low primarily because the probability of a wreck resulting in a nearly "instantaneous" stop of a massive pressure vessel is extremely low. Typically in such wrecks a considerable period of time, in fractions of seconds, is expended as the vessel crushes its way through soft rock, dirt or debris. This time can even extend to several seconds if the vessel rebounds, bounces, tumbles, slides or rolls during its deceleration. Another known design in light wall tanks, such as gasoline trailers, provides internal baffling to impede the flow the liquid from one end of the vessel to the other during controlled stops. This is shown for example in U.S. Pat. No. 4,251,005, whose entire contents are hereby incorporated by reference.

In piping systems, the water hammer problem is addressed in one of two basic ways. First, the minimum time for deceleration is extended by means of slow operating valves. Second, a means of absorbing or relieving the pressures developed is provided. This means can include placing pressure relief valves near the point of stoppage. Another means is by placing gas filled chambers or dampeners near the point of stoppage to expend the kinetic energy of the slowing liquid in compressing the gas of the dampener.

Additionally, containers, such as bumpers, bags or drums, filled with fluids, such as water, oil, gas or sand, are used by highway safety engineers to expend the kinetic energy of a highway collision over considerable distance, and therefore time, to mitigate the forces developed in the collision.

SUMMARY OF THE INVENTION

Accordingly, a principal object of the present invention is to provide a simple system which can be added to or built into transportation pressure vessels for reducing the probability of vessel failure due to water hammer pressure following a collision.

Directed to achieving this object, a novel fluid transport apparatus with a water hammer or eliminator system is herein provided. The system is positioned inside of the transportation pressure vessel so that the sudden acceleration or surge of the liquid within the vessel impacts directly on this internal system to thereby dissipate or eliminate the water hammer pressure. The system very simply comprises one or more breakable containers of compressed fluid positioned within the vessel and adapted to break by the force of the vessel fluid surging against them following a vessel impact. The breakable containers collapse and the compressible fluid therein absorbs the energy of the surging vessel fluid. The breakable containers can take many forms including end bladders positioned at preferably both ends of the vessel and having rupture discs or other weaknesses constructed therein, or a plurality of collapsible containers, such as ordinary tennis balls, held at one or both of the vessel ends.

Other objects and advantages of the present invention will become more apparent to those persons having ordinary skill in the art to which the present invention pertains from the foregoing description taken in conjunction with the accompanying drawings.

DETAILED DESCRIPTION OF PREFERRED EMBODIMENTS OF THE INVENTION

Figure 1:
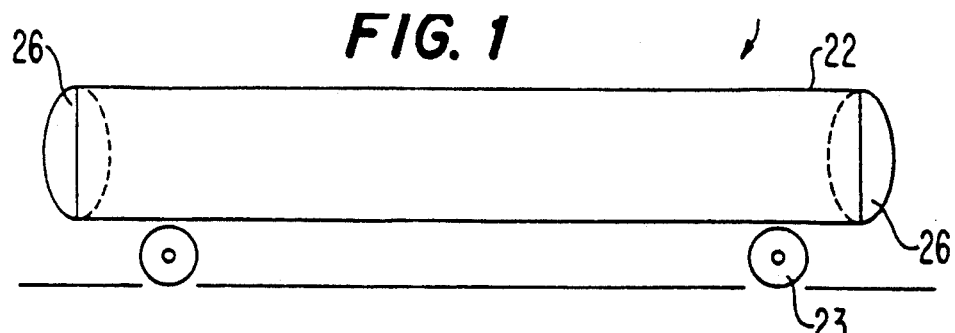
FIG. 1 is a schematic side elevational view of a first fluid transport apparatus of the present invention.

Referring to FIG. 1, a fluid transport apparatus of the present invention is illustrated generally at 20. The fluid transport apparatus 20 can comprise an existing elongated fluid transport vessel 22 supported on wheel assemblies 23 and equipped with water hammer pressure eliminator systems 26 as shown generally in FIG. 1 at both ends of and inside of the vessel 22. The fluid transport vessel 22 can be adapted for transporting liquefied materials 24, and particularly liquefied hazardous materials such as liquefied pressurized gas, and can comprise a tank car or a tank trailer.

Figure 2:
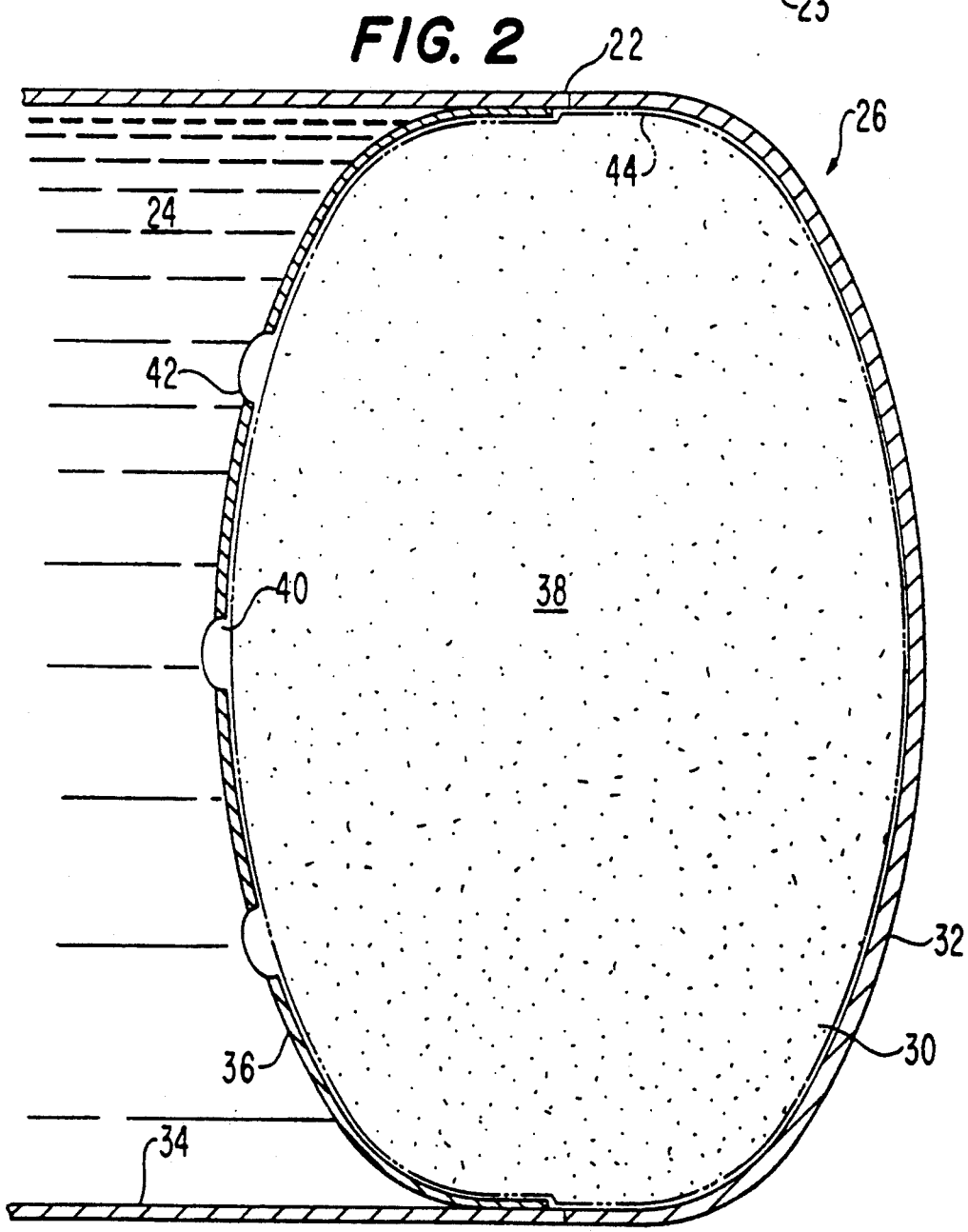
FIG. 2 is an enlarged longitudinal cross-sectional view of one end of the fluid transport apparatus of FIG. 1.

A first embodiment of the water hammer pressure eliminator system 26 of the present invention is shown in FIG. 2. It is seen there that at both ends of the vessel 22 a compartment 30 is formed using the head 32 and a portion of the length of the wall 34 of the vessel as part of the compartment surface. The interior wall of the compartment is formed by an internal partition 36 extending across the diameter of the interior of the vessel 22 and secured thereto. This internal partition 36 is preferably elliptically or hemispherically configured and disposed towards the center of the vessel. It is constructed such that its strength before failure on application of pressure from the interior of the vessel 22, as during a water hammer pressure event, is approximately one-half that of the walls of the vessel 22 itself. The elliptical internal partition 36 has a thickness of approximately one-half of the thickness of the shell of the vessel 22. The compartment 30 thereby formed is filled with a compressible gas 38 which is selected to be above its critical temperature at all normal ambient temperatures.

This internal partition or wall 36 can be provided with one or more orifices 40 sized to allow the volume of the compartment 30 thereby formed to fill with vessel fluid 2 4 in about one to two seconds, if the fluid is passing through these orifices at approximately the speed of sound under operating conditions. These orifices 40 are equipped with frangible or rupture discs 42 rated to break at a pressure differential somewhat below the collapsing strength of the internal partition 36.

The compartment 30 is preferably pressurized with an inert gas 38, such as nitrogen, selected to be above its critical temperature during normal operation, and pressurized to a pressure up to one-half the working pressure of the vessel 22. For example, if the working pressure of the vessel fluid 2 4 is four hundred psig, then the compartment 30 can be preloaded with nitrogen at two hundred psig, and the rupture discs 42 set at eight hundred psig. The compartment 30 can further be outlined with a membrane bladder 44. The rupture discs 42 disposed in the orifices 40 can then form a surface of this bladder 44, or they can be attached and supported directly by the internal partition 36.

Figure 3:
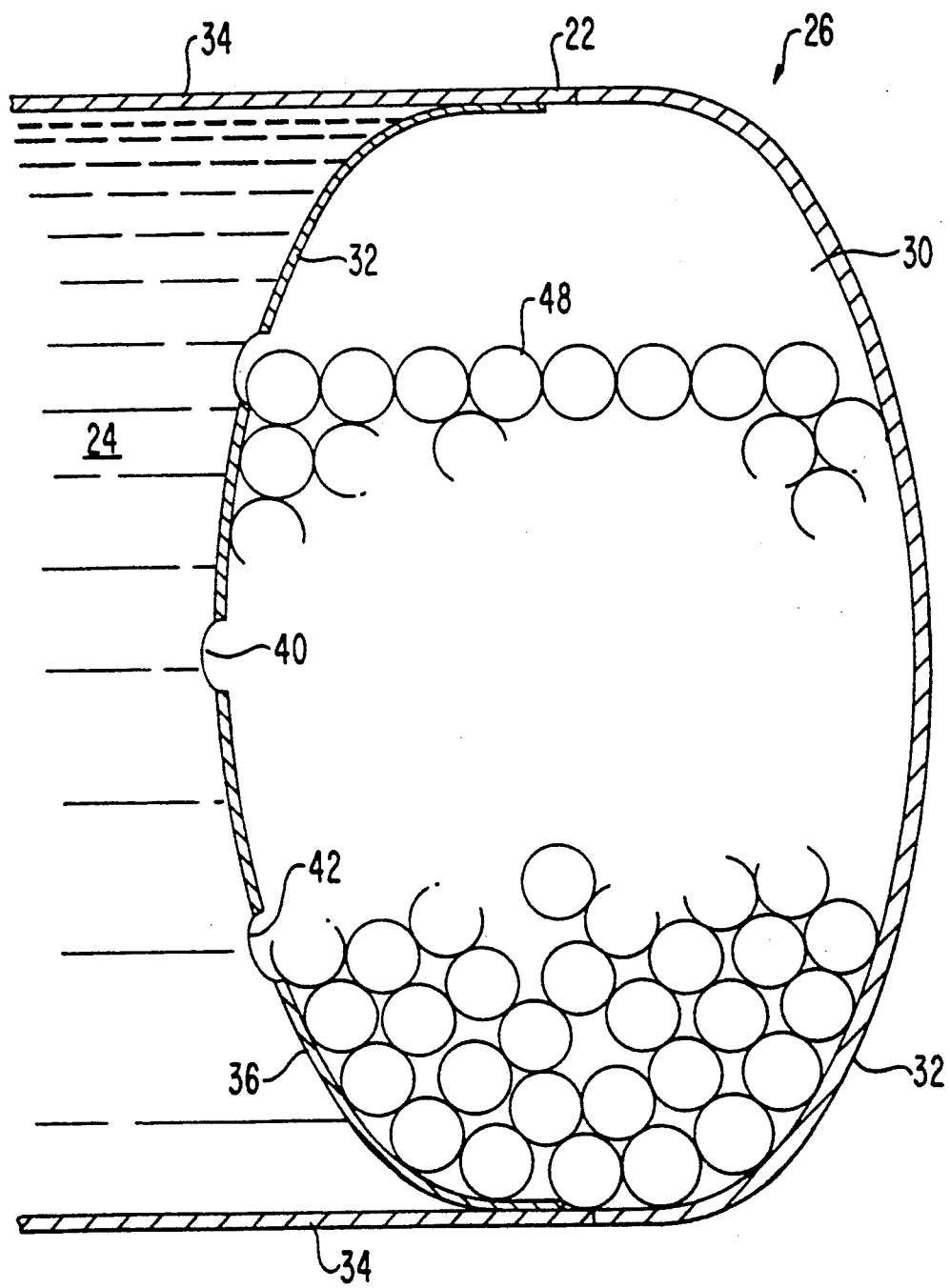
FIG. 3 is a view similar to that of FIG. 2 illustrating an alternative embodiment thereof.

An alternative to the system of FIG. 2 is shown in FIG. 3 wherein a plurality of collapsible containers 48 are disposed in the end compartment 30. These containers 48 can be shaped as spheres, ellipsoids or cylinders and are preloaded or pressurized with an inert gas above its critical temperature. An example of suitable collapsible containers 48 is common pressurized rubber balls, such as tennis balls. In lieu of these containers 48 the compartment 30 can be filled or substantially filled with crushable or collapsible media such as low density foamed urethane, styrene or rubber.

Figure 4:
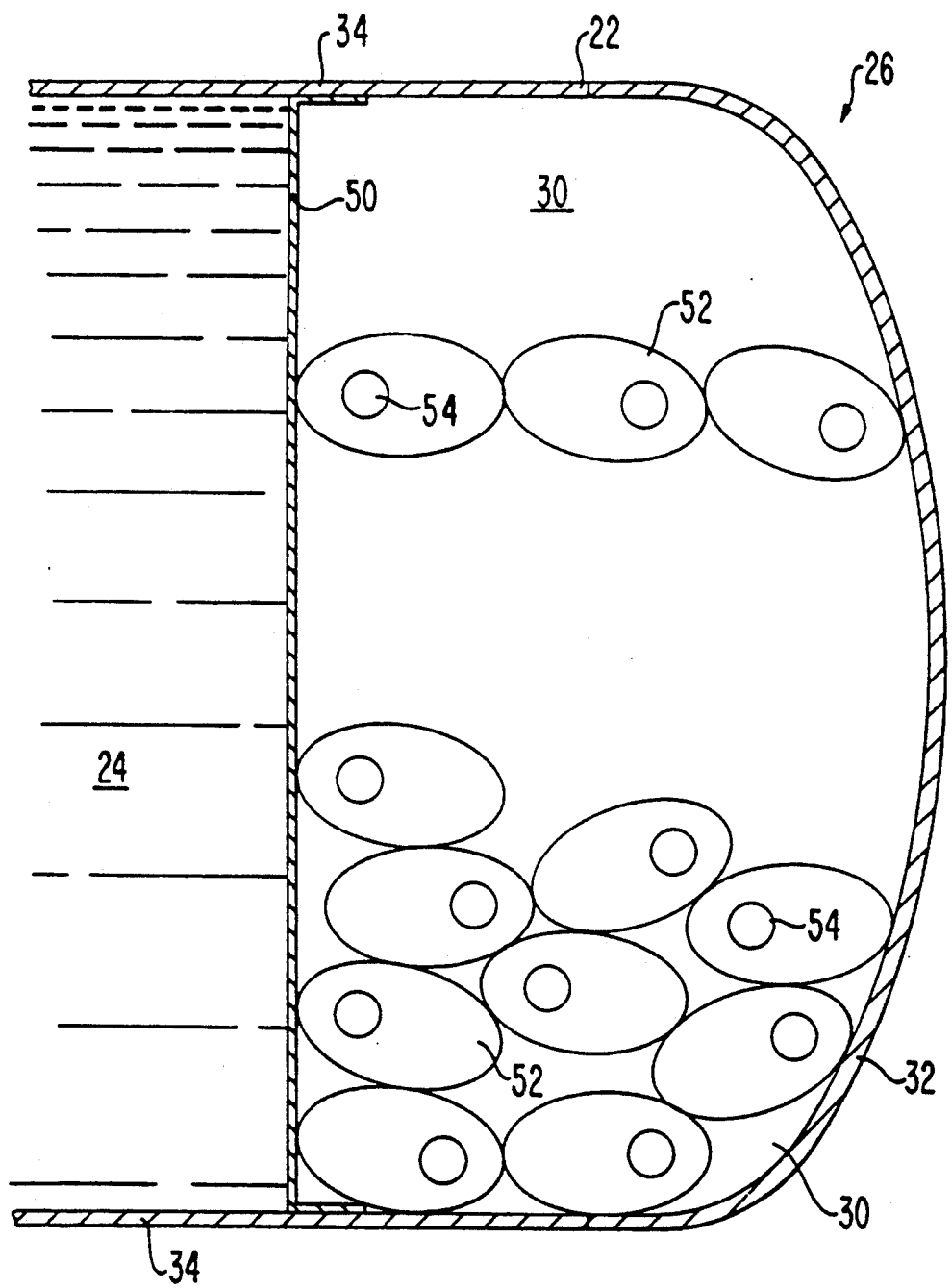
FIG. 4 is a view similar to that of FIGS. 2 and 3 illustrating a further embodiment thereof.

A further variation of this system is illustrated in FIG. 4. In this variant, the internal partition 50 is formed merely by a restraining mesh or a lightweight, non-pressure bearing membrane to maintain the contents of the compartment 30 in position at the ends of the vessel 22. The volume of the end compartment 30 thereby formed is then filled or substantially filled with leak-tight spherical or ellipsoidal containers 52. These containers 52 are preferably of a compatible metal such as stainless steel and contain a compressible gas above its critical temperature. Containers 52 are pressurized to at least one-half the working pressure of the vessel 22 itself with this gas, and they are designed to maintain their shape and integrity throughout the working pressure range of the vessel. However, by design, they will fail once a set pressure is exceeded as during a water hammer event. This failure can be due to a careful selection of the thicknesses of the walls of the containers 52 so that they thereby crush. Alternatively, they can fail by rapidly admitting fluid therein, as by providing rupture discs 54 thereon.

The behavior of the water hammer eliminator system(s) 26 as illustrated in FIGS. 1-4 and described herein will now be described. In normal operation, the system 26 occupies dead space inside of the vessel 22, preferably equal to about twenty percent of the volume of the liquid 24 in the vessel 22, that is ten percent at each end thereof. At the time of impact, the liquid 24 in the vessel 22 forms a column moving towards the impacted end at no more than the speed of the vessel just prior to impact. As the liquid 24 meets the area of the compartment 30 crushing forces rapidly develop, breaking the rupture discs 42, if any, and spilling the liquid 24 into the volume of the compartment 30. If no discs are present then the crushing force pushes the entire partition 36 (or 50) back into the compartment 30, thereby sacrificing the weaker internal partition wall. The gas trapped in the compartment 30 and/or in the smaller containers 48 or 52 therein, such as the tennis balls and so forth, is then compressed rapidly absorbing the energy of the column of liquid in compressive work. The filling of the compartment 30 and/or of the individual containers 48, 52 therein with the liquid or the crushing of the compartment 30 and/or the media (balls 48, foam and so forth) therein by the oncoming liquid consumes a finite amount of time which is at least as long as the time required for the initial pressure wave of the impacting liquid to travel the length of the vessel 22 and reflect back to the point of origin where it can begin to cancel the pressure rise resulting from the impact.

Thus, the present invention is a system involving one or more simple devices added to a transportation pressure vessel to increase the compressibility of the system and/or to increase the length of time for fluid deceleration in the vessel stopped by sudden impact as during a collision or derailment. This system reduces the magnitude of the pressure waves developed during the sudden deceleration of a liquid, commonly known as "water hammer" pressure, thereby decreasing the probability of vessel failure during or following a collision.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A fluid transport apparatus comprising:
   an elongated fluid transport vessel having a vessel interior, first and second vessel end walls, and first and second vessels ends within said vessel interior and generally adjacent said first and second vessel end walls, respectively; and
   a partition in said vessel interior and at said vessel first end, said partition defining at least in part a compartment filled at least in part with a compressible fluid, said partition having a partition surface disposed generally away from said first vessel end wall and one or more rupture discs dispersed on said partition surface, said rupture discs, when said elongated fluid transport vessel is impacted, being adapted to break generally before said partition breaks by the surge of fluid in said vessel interior towards said first vessel wall thereby compressing said compressible fluid, dissipating the water hammer pressure in said vessel interior and preventing said first vessel end wall from failing.

2. The fluid transport apparatus of claim 1 further comprising a bladder disposed in and generally filling said compartment.

3. The fluid transport apparatus of claim 1 wherein said internal partition is constructed so as to fail before said elongated fluid transport vessel fails.

4. The fluid transport apparatus of claim 1 wherein said internal partition is constructed with a failure strength of about half that of said elongated fluid transport vessel.

5. The fluid transport apparatus of claim 1 wherein said internal partition has a plurality of partition orifices therethrough and said rupture discs are disposed in different said partition orifices.

6. The fluid transport apparatus of claim 5 wherein said rupture discs disposed in said partition orifices are adapted to break at a pressure differential below the collapsing strength of said internal partition and above the differential pressure at the maximum working pressure of said elongated fluid transport vessel.

7. The fluid transport apparatus of claim 1 wherein said internal partition comprises an elliptical wall secured to said elongated fluid transport vessel.

8. The fluid transport apparatus of claim 1 wherein said internal partition comprises a hemispherical wall secured to said elongated fluid transport vessel.

9. The fluid transport apparatus of claim 1 wherein said internal partition has a thickness which is generally one half of the thickness of said first vessel end wall.

10. The fluid transport apparatus of claim 1 wherein said compressible fluid comprises an inert gas which is above its critical temperature during normal operation of said elongated fluid transport vessel.

11. The fluid transport apparatus of claim 10 wherein said inert gas is nitrogen.

12. The fluid transport apparatus of claim 1 wherein said compressible fluid is pressurized to a pressure up to about half of the working pressure of said elongated fluid transport vessel.

13. The fluid transport apparatus of claim 1 wherein said partition defines a first partition, said compartment defines a first compartment, and further comprising a second partition in said vessel interior and at said vessel second end, said second partition defining a second compartment filled with a compressible fluid, said second partition having a second partition surface disposed generally away from said second vessel end wall and a plurality of second partition rupture discs dispersed on said second partition surface, said second partition rupture discs, when said elongated fluid transport vessel is impacted, breaking generally before said second partition breaks by the surge of fluid in said vessel interior towards said second vessel end wall thereby compressing said compressible fluid in said second partition, dissipating the water hammer pressure and preventing said second vessel end wall from failing.

14. The fluid transport apparatus of claim 1 further comprising a wheel assembly secured to and generally beneath said elongated fluid transport vessel.

15. The fluid transport apparatus of claim 1 wherein at least one of said rupture discs is set to fail at a differential pressure approximately half of the working pressure of fluid in said elongated fluid transport vessel.

16. The fluid transport apparatus of claim 1 wherein said compartment is preloaded with a pressure generally one half of the working pressure of said elongated fluid transport vessel.

17. The fluid transport apparatus of claim 1 wherein said compartment is preloaded with a pressure of generally 200 psig and said rupture discs are set at generally 800 psig.

18. The fluid transport apparatus of claim 1 wherein said partition surface is defined by a curved bulkhead in said vessel interior and secured to said elongated fluid transport vessel.

19. A fluid transport apparatus comprising:
   an elongated fluid transport vessel having a vessel interior, first and second vessel end walls and first and second vessel ends within said vessel interior and generally adjacent said first and second vessel end walls, respectively;
   a plurality of crushable pressurized containers in said vessel interior and at said first vessel end; and
   a retaining means for retaining said crushable pressurized containers at said first vessel end;
   wherein said crushable pressurized containers, when said elongated fluid transport vessel is impacted, are crushed by the surge of fluid within said fluid transport vessel towards said elongated first vessel end thereby dissipating the water hammer pressure and preventing said first vessel end wall from failing.

20. The fluid transport apparatus of claim 19 wherein said crushable pressurized containers are stacked one on top of another and generally fill said first vessel end up to the top of said elongated fluid transport vessel.

21. The fluid transport apparatus of claim 19 wherein said crushable pressurized containers are at least substantially filled with a crushable or collapsible media.

22. The fluid transport apparatus of claim 19 wherein said crushable or collapsible media comprises a low-density foamed urethane or styrene.

23. The fluid transport apparatus of claim 19 wherein said crushable pressurized containers are preloaded with an inert gas above its critical temperature.

24. The fluid transport apparatus of claim 19 wherein said crushable pressurized containers are shaped as ellipsoids or as cylinders.

25. The fluid transport apparatus of claim 19 wherein said crushable pressurized containers comprise pressurized rubber-wall balls.

26. The fluid transport apparatus of claim 19 wherein said crushable pressurized containers comprise tennis balls.

27. The fluid transport apparatus of claim 19 wherein said retaining means comprises a restraining mesh extending generally across the diameter of said elongated fluid transport vessel.

28. The fluid transport apparatus of claim 19 wherein said retaining means comprises a non-pressure bearing membrane.

29. The fluid transport apparatus of claim 19 wherein said retaining means is permeable to the fluid in said elongated fluid transport vessel.

30. The fluid transport apparatus of claim 19 wherein said retaining means is impermeable to the fluid in said elongated fluid transport vessel.

31. The fluid transport apparatus of claim 19 wherein said crushable pressurized containers are formed of a metal which is compatible with the fluid in said elongated fluid transport vessel.

32. The fluid transport apparatus of claim 19 wherein said crushable pressurized containers are formed of stainless steel and filled with a compressible gas above its critical temperature.

33. The fluid transport apparatus of claim 19 wherein said crushable pressurized containers are pressurized with gas to at least one half of the working pressure of said elongated fluid transport vessel.

34. The fluid transport apparatus of claim 19 wherein said crushable pressurized containers are constructed to maintain their shape and integrity throughout the working pressure range of said elongated fluid transport vessel and to then fail when a set pressure which is greater than the upper end of the working pressure of said elongated fluid transport vessel is exceeded.

35. The fluid transport apparatus of claim 19 wherein said crushable pressurized containers include rupture discs thereon adapted to rapidly admit fluid therein when a set pressure thereon has been exceeded.

36. The fluid transport apparatus of claim 19 wherein said crushable pressurized containers are leak tight during the working pressure range of said elongated fluid transport vessel.

37. The fluid transport apparatus of claim 19 wherein said elongated fluid transport vessel comprises a liquid transport vessel, and said retaining means defines a compartment in said vessel interior and in which said crushable pressurized containers are positioned, said compartment comprising generally ten percent of the total volume of liquid in said vessel interior.

38. The fluid transport apparatus of claim 19 wherein said plurality of crushable pressurized containers defines a first plurality of crushable pressurized containers, and further comprising a second plurality of crushable pressurized containers in said vessel interior and retained at said second vessel end to protect said vessel second end wall.

39. The fluid transport apparatus of claim 19 further comprising a wheel assembly secured to and positioned generally beneath said elongated fluid transport vessel.

* * * * *